US011021332B2

(12) United States Patent
Heo

(10) Patent No.: US 11,021,332 B2
(45) Date of Patent: Jun. 1, 2021

(54) SHOE OUTSOLE DISPENSING APPARATUS

(71) Applicant: NIKE, Inc., Beaverton, OR (US)

(72) Inventor: Yeong Cheol Heo, Busan (KR)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/759,176

(22) PCT Filed: Oct. 23, 2018

(86) PCT No.: PCT/US2018/057143
§ 371 (c)(1),
(2) Date: Apr. 24, 2020

(87) PCT Pub. No.: WO2019/084034
PCT Pub. Date: May 2, 2019

(65) Prior Publication Data
US 2020/0339361 A1    Oct. 29, 2020

(30) Foreign Application Priority Data

Oct. 25, 2017 (KR) .......................... 10-2017-0138926

(51) Int. Cl.
*B65G 47/71* (2006.01)
*A43D 111/00* (2006.01)
*B65G 13/07* (2006.01)
*B65G 43/08* (2006.01)
*B65G 47/64* (2006.01)
*B65G 47/54* (2006.01)

(52) U.S. Cl.
CPC ........ *B65G 47/715* (2013.01); *A43D 111/006* (2013.01); *B65G 13/07* (2013.01);
(Continued)

(58) Field of Classification Search
CPC ...... B65G 47/715; B65G 21/10; B65G 43/08; B65G 13/07; B65G 47/647; B65G 41/006;
(Continued)

(56) References Cited

U.S. PATENT DOCUMENTS 1,741,616 A * 12/1929 Crady .................... B65G 13/10
193/36
1,808,134 A * 6/1931 Gotthardt ............. B65G 47/487
198/349

(Continued)

*Primary Examiner* — Mark A Deuble
(74) *Attorney, Agent, or Firm* — Shook, Hardy & Bacon L.L.P.

(57) ABSTRACT

A shoe outsole dispensing apparatus having a dispenser located above the conveyor carrying adhesive-coated shoe outsoles that are classified into left outsoles and right outsoles and that are dispensed such that the left outsoles to a first side of the conveyor and the right outsoles to a second side of the conveyor is provided. A controller controls the operation of the dispenser. As a result of the outsoles coated with adhesive being automatically classified as left and right outsoles by the dispenser, and the outsoles are dispensed on opposite sides of the conveyor carrying the outsoles, this has the result that productivity of assembling shoes greatly increased as a result of the ability to dispose outsoles very quickly compared to the prior art operation of manually sorting the outsoles, and also the occurrence of shoe defects due to manual errors may be prevented, thus enhancing shoe quality.

4 Claims, 7 Drawing Sheets

(51) Int. Cl.
(52) U.S. Cl.
    CPC ............. *B65G 43/08* (2013.01); *B65G 47/54* (2013.01); *B65G 47/647* (2013.01); *B65G 2203/0283* (2013.01); *B65G 2203/042* (2013.01)
(58) Field of Classification Search
    CPC ...... B65G 2203/042; B65G 2203/0283; B65G 13/10; B65G 41/002; B65G 47/54
    USPC ....................... 198/361, 369.6–369.7; 193/36
    See application file for complete search history.

(56) References Cited

U.S. PATENT DOCUMENTS

| | | | | |
|---|---|---|---|---|
| 1,822,111 | A * | 9/1931 | Howe | B65G 47/48 198/346 |
| 1,854,199 | A * | 4/1932 | Jorgensen | A43D 111/006 271/1 |
| 4,431,104 | A * | 2/1984 | Orlowski | B65G 47/26 198/427 |
| 5,078,255 | A * | 1/1992 | Haley | B65G 47/647 198/358 |
| 2002/0104736 | A1* | 8/2002 | Peppel | B65G 47/647 198/369.2 |
| 2003/0000803 | A1* | 1/2003 | Luevano | B65G 13/12 198/361 |
| 2010/0126824 | A1* | 5/2010 | Scapaccino | B65G 47/54 198/361 |
| 2013/0131854 | A1* | 5/2013 | Regan | A43D 111/00 700/114 |
| 2014/0068878 | A1* | 3/2014 | Chon | A43D 8/26 12/18.5 |

\* cited by examiner

SHOE OUTSOLE DISPENSING APPARATUS

CROSS-REFERENCE TO RELATED APPLICATIONS

This application is a 35 U.S.C. § 371 national stage application of PCT Application Number PCT/US2018/057143, filed Oct. 23, 2018, and entitled "Shoe Outsole Dispensing Apparatus", which claims priority to South Korean Patent Application No. 10-2017-0138926, filed Oct. 25, 2017. The entirety of the aforementioned applications are incorporated by reference herein.

FIELD OF THE INVENTION

This invention relates to a left and/or right shoe outsole dispensing apparatus.

BACKGROUND OF THE INVENTION

In general, shoes are made of a combination of outsole and upper; the process by which this combination is made is described below.

First, when adhesive is applied to outsoles through a conventional adhesive applicator and discharged to a conveyor, the operator classifies the outsoles as the left outsoles and right outsoles, and dispenses the left outsoles to one side of the conveyor and the right outsoles to the other side.

The reason for classifying outsoles into left outsoles and right outsoles as described above is that an operator is stationed on either side of the conveyor who joins the respective outsoles and uppers, so that the operator may perform the operation of joining the outsoles of a consistent direction, which improves the work capacity and also that the shoes may be efficiently managed and so forth because the assembled shoes are immediately classified as left and right shoes.

Although the left and right outsoles are sequentially inserted into the adhesive applicator so that the operator may conveniently and easily dispense them to the respective side of the conveyor without mistake, when performing this repetitive operation over a long period, manual errors frequently occur, leading to the problematic occurrence of defects in the finished shoes.

Moreover, the task of classifying the left outsole and the right outsole manually has led to impaired productivity of the finished shoes, because the work of classifying and dispensing the left and right outsoles is rather slow.

In addition, there has been the problem that the cost per shoe is problematically high due to the consumption of manpower, because the operator must always wait to classify and dispense the outsoles discharged from the adhesive applicator.

SUMMARY OF THE INVENTION

This invention relates to a left and/or right shoe outsole dispensing apparatus, and more specifically to a shoe outsole dispensing apparatus wherein shoe outsoles coated with adhesive are automatically classified as left and right outsoles by a dispenser, and the outsoles are dispensed on opposite sides of the conveyor carrying the outsoles, so that not only is shoe productivity greatly increased as a result of the ability to dispose outsoles very quickly compared to the prior art operation of manually sorting the outsoles, but in addition, the occurrence of shoe defects due to manual errors may be prevented, thus increasing shoe quality.

Problem to be Solved

Aspects contemplated herein have been devised in order to solve all of the aforementioned problems; it has the objective of providing a left and right shoe outsole dispensing apparatus wherein shoe (e.g., article of footwear) outsoles that have been coated with adhesive are automatically classified as left and right outsoles by a dispenser, and the outsoles are dispensed on opposite sides of the conveyor carrying the outsoles, so that not only in productivity of shoes greatly increased as a result of the ability to dispose outsoles very quickly compared to the prior art operation of manually sorting the outsoles, but in addition, the occurrence of shoe defects due to manual errors may be prevented, thus increasing shoe quality.

Aspects hereof also has the objective of providing a shoe outsole dispensing apparatus that may increase the price-competitiveness of shoes by reducing the cost per shoe through reduced personnel costs, because it is not necessary to use as much manpower as in the prior art, inasmuch as the apparatus automatically performs the operation of classifying and dispensing the outsoles.

Problem Solution

To achieve the above objective, the shoe outsole dispensing apparatus according to aspects hereof comprise: a dispenser located above the conveyor carrying the adhesive-coated shoe outsoles, which classifies the adhesive-coated outsoles into left and right outsoles and dispenses the left outsoles to one side of the conveyor and the right outsoles to the other side; a stationary frame that is coupled to the dispenser and fixes the position of the dispenser so that the dispenser remains firmly in position above the conveyor; and a controller that controls the operation of the dispenser.

In addition, the dispenser comprises: a first guide member located near a second guide member that upon receiving an adhesive-coated outsole, either guides the outsole to a first side of the conveyor or to the second guide member; having within it a plurality of rotatable first guide rods that guide the outsoles placed above the first guide rods, a first end of each of which is rotatably connected to the stationary frame so that if the second end drops down, it guides an outsole to a first side of the conveyor, and if the second end rises, it guides an outsole to the second guide member; a second guide member coupled fixedly to the stationary frame that upon receiving an outsole guided by the first guide member, guides it to a second side of the conveyor, having within it a plurality of rotatable second guide rods that guide the outsole placed above the second guide rods; a detection sensor formed on the first guide member that senses the outsoles passing the first guide member and transmits the sensing information to the controller; and a lifting part that raises or lowers the second end of the first guide member so as to determine whether the outsole guided by the first guide member is guided to the first side of the conveyor or to the second guide member; and the controller controls the operation of the lifting part based on the sensing information of the detection sensor.

Further, the lifting part comprises a lifting rod coupled to the first guide member on the lower part of the first guide member, so that it is raised or lowered together with the first guide member; and a lifting cylinder that is controlled by the controller and is located on the lower part of the first guide member, which causes the first guide member to be raised or lowered together with the lifting rod.

In addition, it may further comprise a drive part that impels the guide rods of the guide members to cause the outsoles placed on the guide members to move rapidly, The drive part comprises a drive motor that is coupled to the stationary frame and supplies rotational force; a base gear formed on the shaft of the drive motor that rotates upon receiving the rotational force of the drive motor; auxiliary gears formed on the guide rods of the guide members that rotate with the guide rods; and a plurality of connecting belts formed as a belt or chain that are connected to the base gear and auxiliary gears and are mutually connected with the auxiliary gears so as to transmit the rotational force of the drive motor to the guide rods.

In addition, it further comprises an outsole supply located on the lower part of the first guide member and second guide member respectively, which causes the outsoles guided by the guide members to be conveniently supplied to the conveyor; wherein the outsole supply comprises supply members located on the bottom of the second end of the supply members so as to receive the soles guided by the guide members and guide them to the conveyor, within which a plurality of rotatable supply rods are formed so as to guide the outsoles placed above the supply rods toward the conveyor; and a supply cylinder that is fixed to the lower part of the stationary frame and moves the supply member back and forth so that the outsoles placed on the supply member may be easily set onto the conveyor; and wherein the controller controls the operation of the supply cylinder based on the sensing information from the detection sensor.

Effect of Aspects Contemplated

As described above, the effect of the shoe outsole dispensing apparatus according to this invention, in which shoe outsoles coated with adhesive are automatically classified as left and right outsoles by a dispenser and the outsoles are dispensed on opposite sides of the conveyor carrying the outsoles, is that not only is shoe productivity greatly increased as a result of the ability to dispose outsoles very quickly compared to the prior art operation of manually sorting the outsoles, but in addition, the occurrence of shoe defects due to manual errors may be prevented, thus enhancing shoe quality.

Aspects herein also has the effect of increasing the cost-competitiveness of shoes by reducing the cost per shoe through reduced personnel costs, because it is not necessary to use as much manpower as in the prior art, because the apparatus automatically performs the operation of classifying and dispensing the outsoles.

DETAILED DESCRIPTION OF THE INVENTION

A shoe outsole dispensing apparatus according to aspects hereof will be described in detail with reference to the attached drawings. The detailed description of well-known functions and configurations that are deemed to unnecessarily obscure the outlines of this invention has been omitted.

Figure 1:
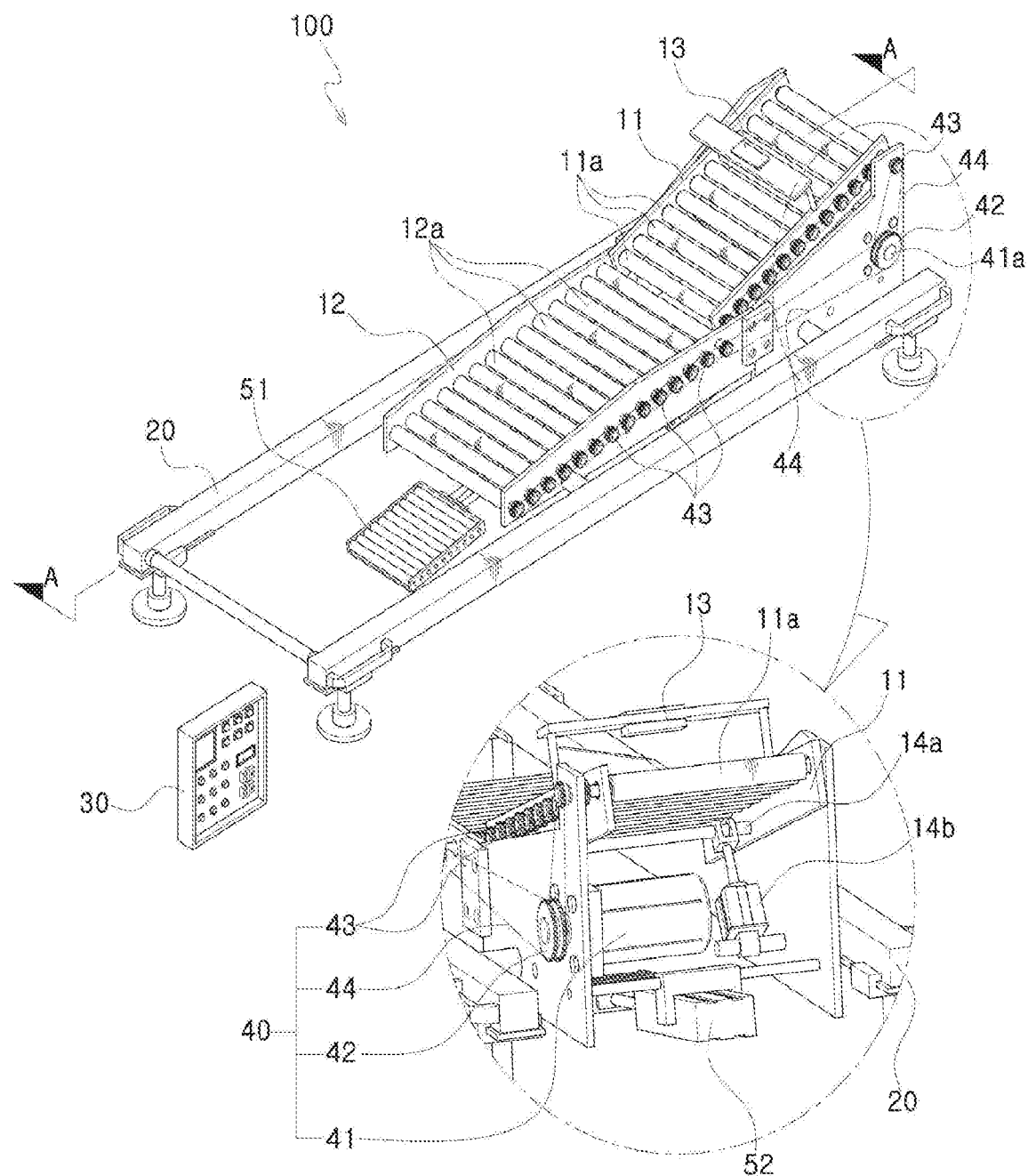
FIG. 1 is a perspective view of a shoe outsole dispensing apparatus according to an aspect of this invention.
Figure 2:
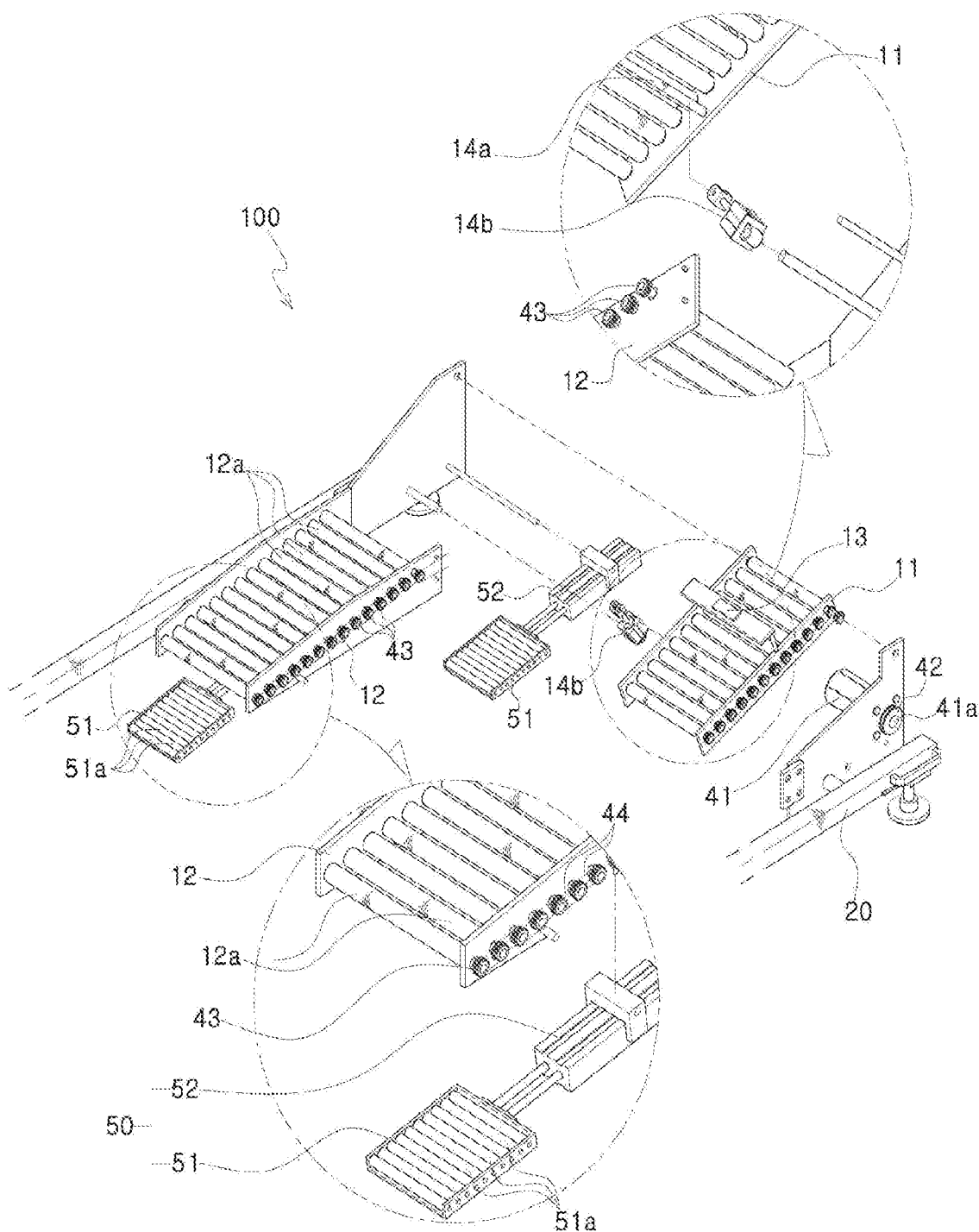
FIG. 2 is an exploded perspective view of the shoe outsole dispensing apparatus shown in FIG. 1.
Figure 3:
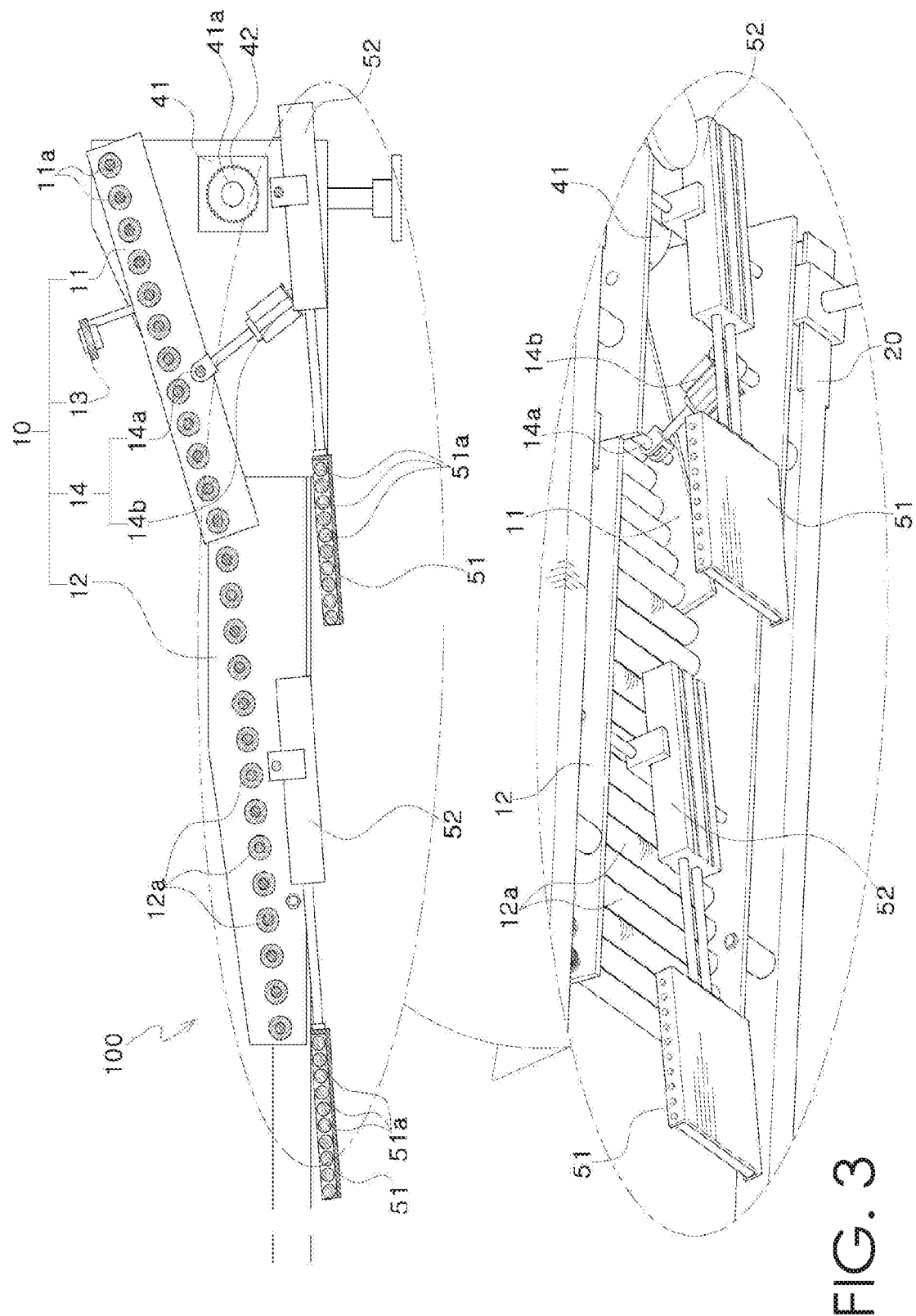
FIG. 3 is a cross-section of a shoe outsole left and right dispensing apparatus shown in FIG. 1 along the A-A section.

FIGS. 1 through 4 depict the shoe outsole dispensing apparatus according to an aspect of this invention; FIG. 1 is a perspective view of a shoe outsole dispensing apparatus according to an aspect of this invention; FIG. 2 is an exploded perspective view of the shoe outsole dispensing apparatus shown in FIG. 1; FIG. 3 is a cross-section of a shoe outsole left and right dispensing apparatus shown in FIG. 1 along the A-A section; and FIG. 4 depicts the use of the shoe outsole dispensing apparatus shown in FIG. 1.

As shown in the drawings, the shoe outsole dispensing apparatus (100) according to an aspect of this invention comprises a dispenser (10), a stationary frame (20), and a controller (30).

As shown in FIGS. 1 to 3, the dispenser (10) is located above the conveyor (3) carrying the adhesive-coated shoe outsoles, and classifies the adhesive-coated outsoles into left outsoles (1) and right outsoles (2) and dispenses the left outsoles (1) to a first side of the conveyor (3) and the right outsoles (2) to a second side of the conveyor (3); and comprises a first guide member (11) located near a second guide member (12) that upon receiving an adhesive-coated outsole, guides the outsole to either a first side of the conveyor (3) or the second guide member (12); having within it a plurality of rotatable first guide rods (11*a*) that guide the outsoles placed above the first guide rods (11*a*), a first end of each of which is rotatably connected to the stationary frame (20) so that if the second end drops down, it guides an outsole to a first side of the conveyor (3), and if the second end rises, it guides an outsole to the second guide member (12); a second guide member (12) coupled fixedly to the stationary frame (20) that upon receiving an outsole guided by the first guide member (11), guides it to a second side of the conveyor (3), having within it a plurality of rotatable second guide rods (12*a*) that guide the outsole placed above the second guide rods (12*a*); a detection sensor (13) formed on the first guide member (11) that senses the outsoles passing the first guide member (11) and transmits the sensing information to the controller (30); and a lifting part (14) that determines whether the outsole guided by the first guide member (11) is guided to the first side of the conveyor (3) or to the second guide member (12) by raising or lowering the second end of the first guide member (11); the controller (30), described below, controls the operation of the lifting part (14) based on the sensing information from the detection sensor (13).

This is designed so that the plurality of guide rods (11*a*, 12*a*) formed in the guide members (11, 12) are inclined downward so that an outsole above the guide rods (11*a*, 12*a*) is naturally guided downward by the guide rods (11*a*, 12*a*).

Conventionally, in order to combine the outsole with the upper of the shoe, an adhesive is applied to the outsole by an adhesive applicator (not shown); and the left outsole (1) and the right outsole (2) are inserted sequentially into the adhesive applicator and coated with adhesive, so that the adhesive-coated left and right outsoles (1, 2) discharged in sequence.

Figure 4A:
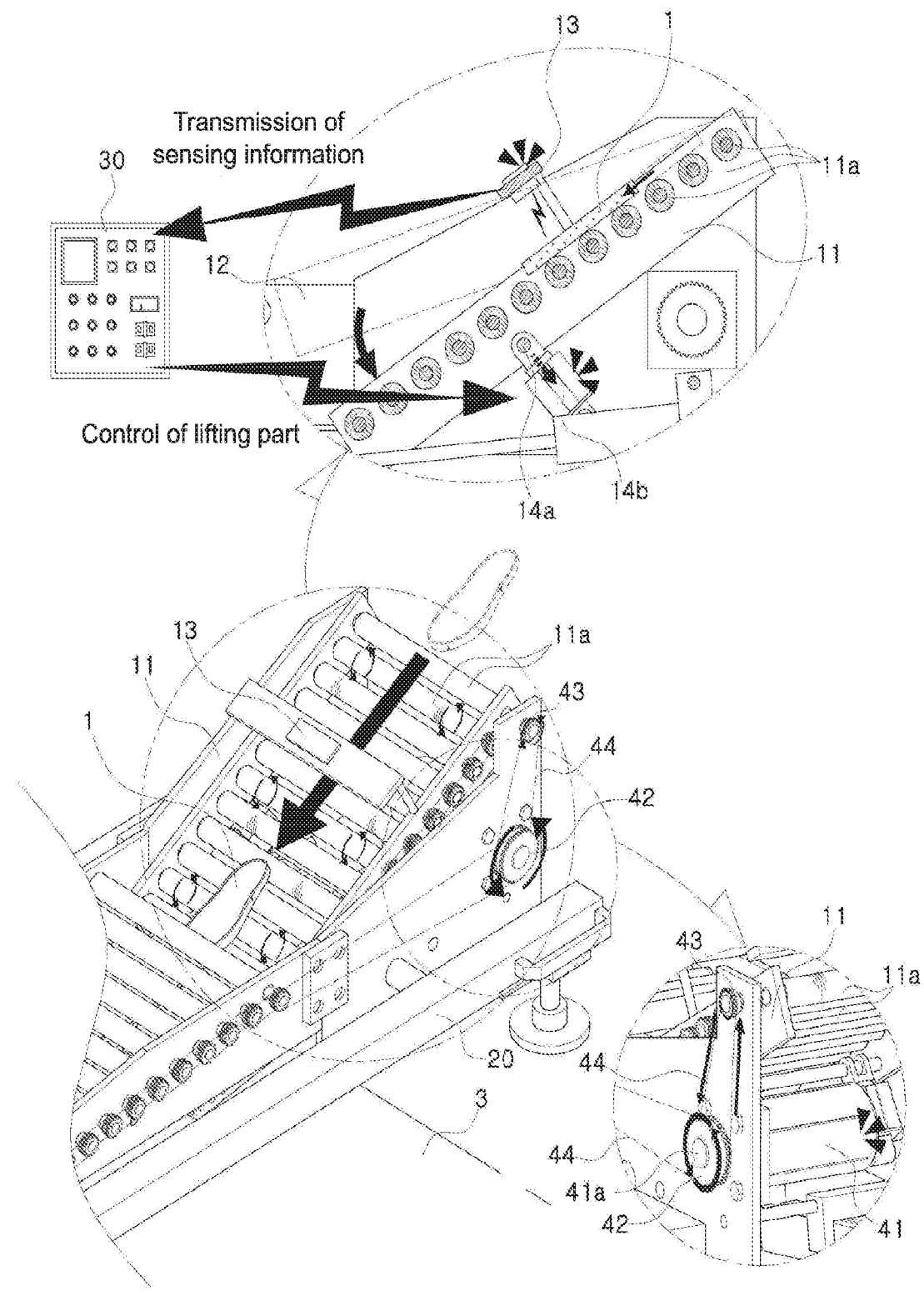
FIG. 4B depicts the use of the shoe outsole dispensing apparatus shown in FIG. 1.
FIG. 4C depicts the use of the shoe outsole dispensing apparatus shown in FIG. 1.
FIG. 4D depicts the use of the shoe outsole dispensing apparatus shown in FIG. 1.

In other words, as shown in FIG. 4A, when the left outsole (1) is discharged by the adhesive applicator to the first guide member (11) of the dispenser (10), it is carried by the first guide rods (11*a*) of the first guide member (11) and discharged to a first side of the conveyor (3).

At this time, the detection sensor (13) transmits sensing information to the controller (30) regarding the outsoles passing through the first guide member (11), and the controller (30), having received the sensing information, lowers the second end of the first guide member (11) close to the conveyor (3) by the lifting part (14) so that the left outsole (1) is discharged to the first side of the conveyor (3) as a result of being guided by the first guide member (11).

The second end of the first guide member (11) is positioned near the first side of the conveyor (3), so that a left outsole (1) discharged via the first guide member (11) is discharged to the first side of the conveyor (3).

Figure 4B:
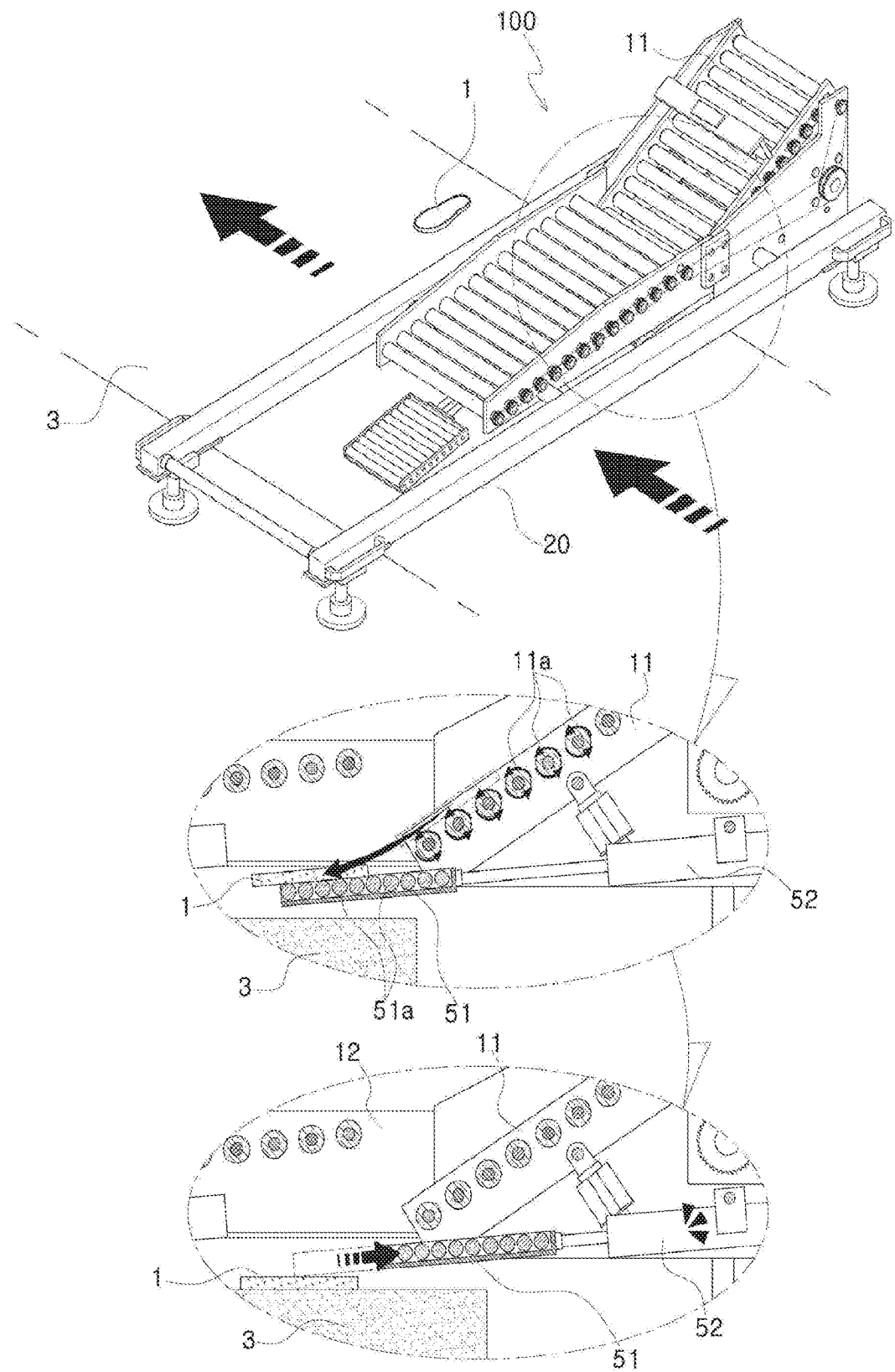
Figure 4C:
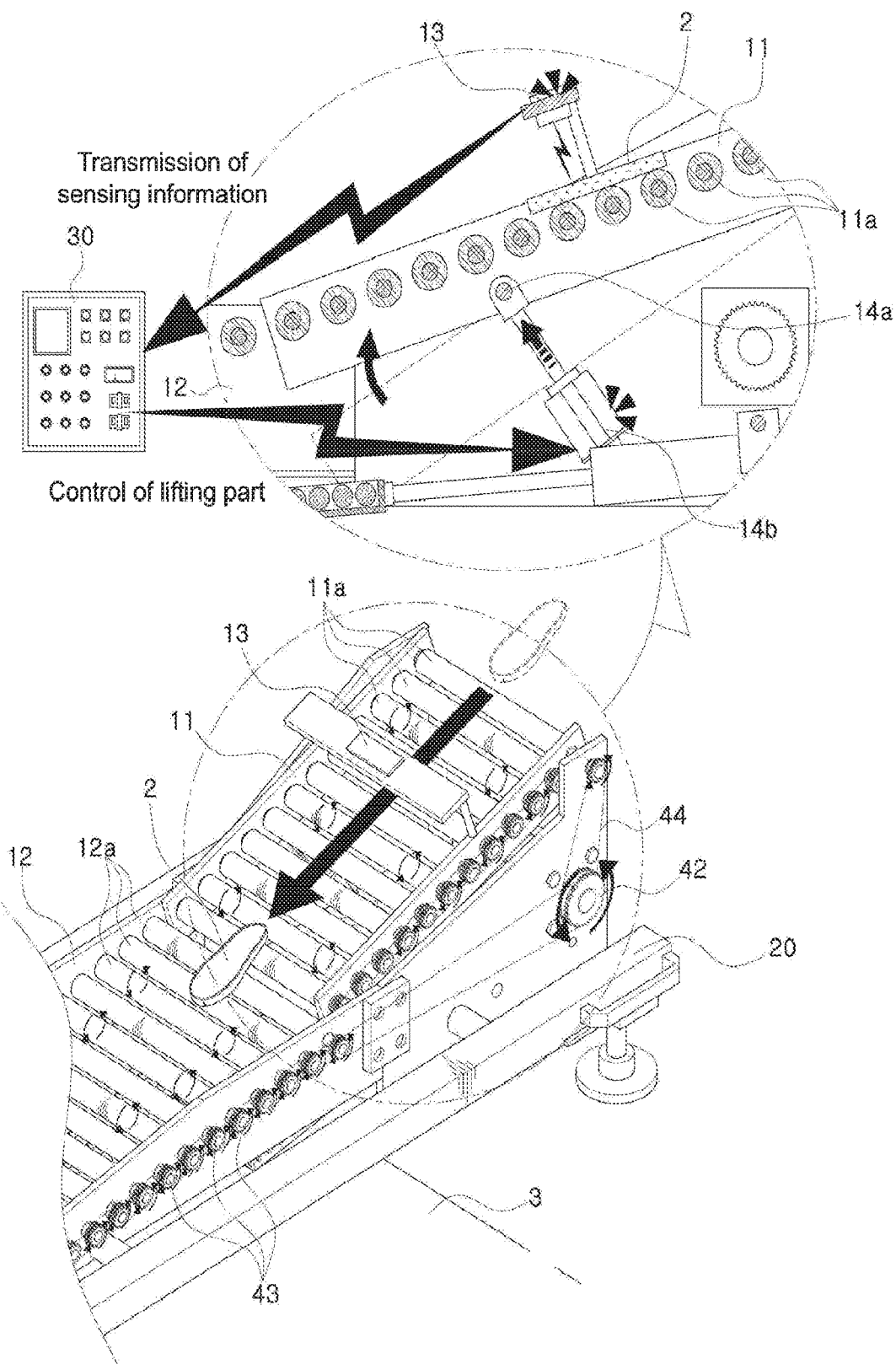

Next, as shown in FIG. 4C, when a right outsole (2) is discharged by the adhesive applicator and passes by the first guide member (11), the controller (30), based on the sensing information from the detection sensor (13), raises the second end of the first guide member (11) by the lifting part (14), so that the right outsole (2) guided by the first guide member (11) is fed to the second guide member (12), and that right outsole (2) is then carried by the second guide rods (12*a*) of the second guide member (12) so as to be discharged to a second side of the conveyor (3).

Of course, the second end of the second guide member (12) is positioned close to the second side of the conveyor (3).

Accordingly, from among the outsoles sequentially supplied from the adhesive applicator, through repeated raising and lowering of the second end of the first guide member (11), the dispenser (10) automatically dispenses the left outsoles (1) to a first side of the conveyor (3) and the right outsoles (2) to the right side of the conveyor (3).

As shown in FIGS. 1 to 3, the lifting part (14) comprises a lifting rod (14*a*) coupled to the first guide member (11) on the lower part of the first guide member (11), so that the rod is raised or lowered together with the first guide member (11); and a lifting cylinder (14*b*) that is controlled by the controller (30) and is located on the lower part of the first guide member (11), which causes the first guide member (11) to be raised or lowered together with the lifting rod (14*a*); and, as shown in FIGS. 4A and 4C, when it is required to lower the second end of the first guide member (11), the lifting cylinder (14*b*) pulls the first guide member (11) down together with the lifting rod (14*a*), compelling the second end of the first guide member (11) to be lowered; and when it is required to raise the second end of the first guide member (11), the lifting cylinder (14*b*) pushes the first guide member (11) up together with the lifting rod (14*a*), compelling the second end of the first guide member (11) be raised.

As shown in FIG. 1, the stationary frame (20) is coupled to the dispenser (10) so as to fix the position of the dispenser (10) so that the dispenser (10) is fixedly located above the conveyor (3).

As shown in FIG. 1, the controller (30) controls the operation of the dispenser (10) and the operation of the below-described drive part (40) and outsole supply (50).

As shown in FIGS. 1 to 3, it further comprises a drive part (40) that impels the guide rods (11*a*, 12*a*) of the guide members (11, 12) to cause the outsoles placed on the guide members (11, 12) to move rapidly; wherein the drive part (40) comprises a drive motor (41) that is coupled to the stationary frame (20) and supplies rotational force; a base gear (42) formed on the shaft (41*a*) of the drive motor (41) that rotates upon receiving the rotational force of the drive motor (41); auxiliary gears (43) formed on the guide rods (11*a*, 12*a*) of the guide members (11, 12) that rotate with the guide rods (11*a*, 12*a*); and a plurality of connecting belts (44) formed as a belt or chain that are connected to the base gear (42) and auxiliary gears (43) and are mutually connected with the auxiliary gears (43) so as to transmit the rotational force of the drive motor (41) to the guide rods (11*a*, 12*a*).

Of course, the guide rods (11*a*, 12*a*) of said guide members (11, 12), which are rotated by receiving power from the drive motor (41), are connected to the base gear (42) and auxiliary gears (43) via the connecting belt (44) so that they all rotate in one direction.

In other words, as shown in FIGS. 4A and 4C, through the rotation of the guide rods (11*a*, 12*a*) of the guide members (11, 12) by the drive part (40), the outsoles transported on the guide rods (11*a*, 12*a*) are transported very quickly and accurately, so that a large quantity of outsoles may be rapidly classified as left and right outsoles (1, 2) and dispensed by the dispenser (10), which may ultimately lead to a substantial improvement in productivity.

Of course, the operation of the drive part (40) here is controlled by the controller (30).

As shown in FIGS. 1 to 3, the invention further comprises an outsole supply (50) located respectively below the first guide member (11) and second guide member (12), that supplies outsoles guided by the guide members (11, 12) onto the conveyor (3); wherein the outsole supply (50) comprises: supply members (51) located on the bottom of the second end of the supply members (11,12) so as to receive the soles guided by the guide members (11, 12) and guide them to the conveyor (3), within which a plurality of rotatable supply rods (51*a*) are formed so as to guide the outsoles placed above the supply rods (51*a*) toward the conveyor (3); and a supply cylinder (52) that is fixed to the lower part of the stationary frame (20) and moves the supply member (51) back and forth so that the outsoles placed on the supply member (51) may be easily set onto the conveyor (3); and wherein the controller (30) controls the operation of the supply cylinder (52) based on the sensing information from the detection sensor (13).

Of course, this is designed so that the plurality of supply rods (51*a*) formed in the supply member (51) are inclined downward so that an outsole placed on the supply rods (51*a*) is naturally led downward by the supply rods (51*a*).

Figure 4D:
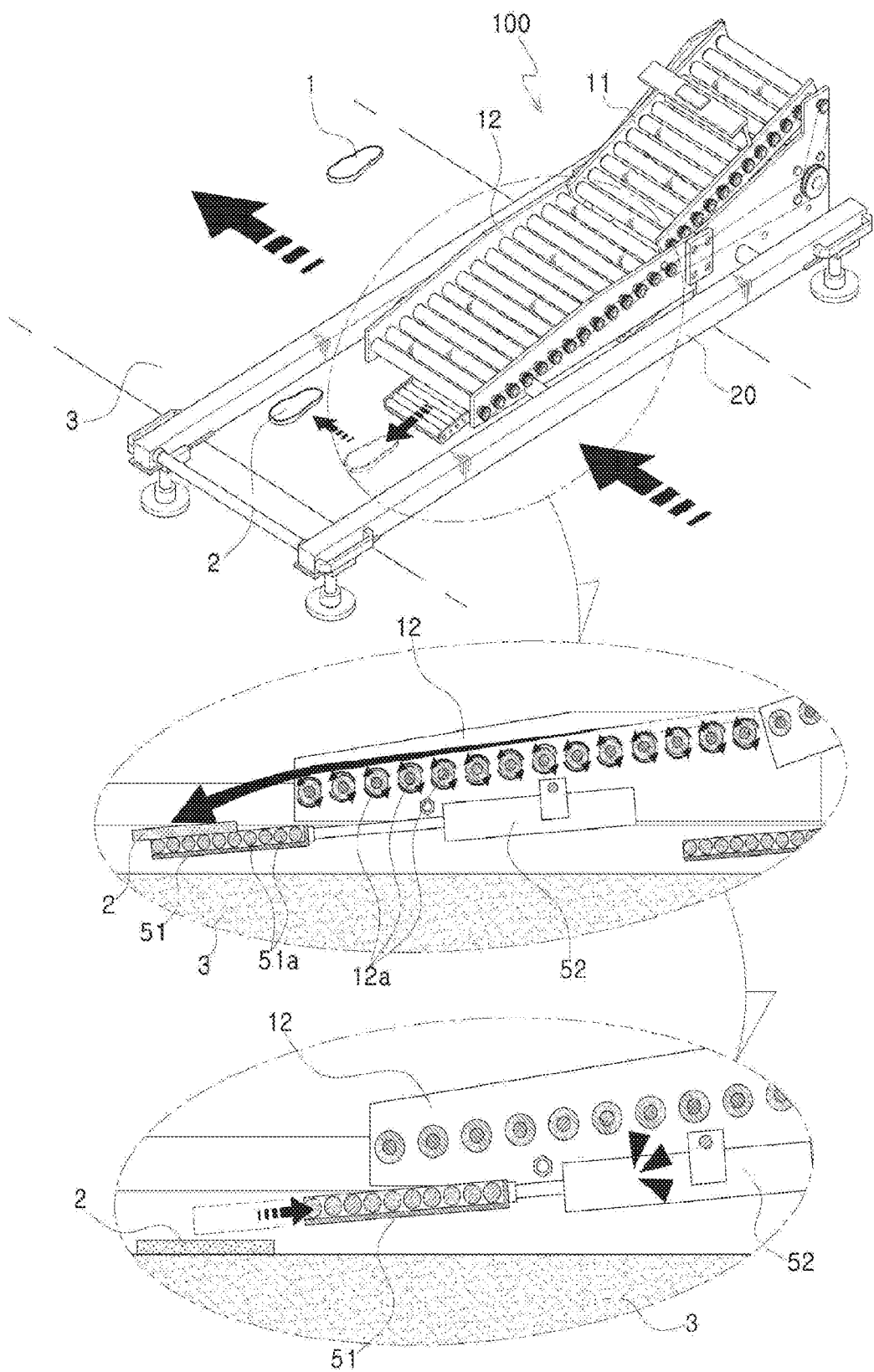

In other words, as shown in FIGS. 4B and 4D, when outsoles are transported to the second end of the guide members (11, 12) and supplied to the supply member (51), as they are guided to the conveyor (3) by the supply rod (51*a*) of the supply member (51), part of the outsoles pass to the conveyor (3) while the remainder pass to the supply member (51); in the latter case, by moving the supply member (51) backward by the supply cylinder (52), the outsoles passing via the supply member (51) are naturally placed on the conveyor (3).

In this case, when an outsole placed on the conveyor (3) is transported by the conveyor (3), the supply member (51) is moved back to its forward position by the supply cylinder (52), to prepare it for placing the next outsole.

Of course, with regard to the outsole supply (50) positioned respectively below the first and second guide members (11, 12), the action of the outsole supply (50) located on the guide members (11, 12) that transport outsoles under the control of the controller (30) guides the outsoles to the conveyor (3).

The shoe outsole dispensing apparatus (100) according to this invention, consisting of the above-described components, in which adhesive-coated outsoles are automatically classified as left outsoles (1) and right outsoles (2) via the dispenser (10) and are discharged separately to a first and second side of the conveyor (3), has the effect that shoe productivity is greatly increased as a result of the ability to dispose outsoles very quickly compared to the prior art operation of manually sorting the outsoles, and in addition, that the occurrence of shoe defects due to manual errors may be prevented, thus enhancing shoe quality.

This invention also has the effect of increasing the cost-competitiveness of shoes by reducing the cost per shoe through reduced personnel costs, because it is not necessary to use as much manpower as in the prior art, because the apparatus automatically performs the operation of classifying and dispensing the outsoles.

The shoe outsole dispensing apparatus (100) according to an aspect of this invention, having the above-described configuration, classifies the outsoles into left outsoles (1) and right outsoles (2) as described below, and dispenses them onto a first side and second side of the conveyor (3).

First, the shoe outsole dispensing apparatus (100) of this invention is installed above a conveyor (3) on which outsoles are transported, and is installed so as to be able to receive outsoles supplied from an adhesive applicator (not shown).

Next, as shown in FIG. 4A, when the left outsole (1) is discharged by the adhesive applicator to the first guide member (11) of the dispenser (10), it is guided by the first guide member (11) and discharged to a first side of the conveyor (3).

At this time, based on sensing information from the detection sensor (13), the second end of the first guide member (11) is lowered close to the conveyor (3) so that a left outsole (1) is discharged to the first side of the conveyor (3).

Next, as shown in FIG. 4B, the left outsole (1) discharged by the first guide member (11) is guided by a supply member (51) of the outsole supply (50) located below the first guide member (11) and is discharged to a first side of the conveyor (3); at this time, the supply member (52) is transported backward through by supply cylinder (52) so that the left outsole (1) passing the supply member (51) is stably placed on the conveyor (3).

Next, as shown in FIG. 4C, when a right outsole (2) is discharged by the adhesive applicator and passes the first guide member (11), based on the sensing information from the detection sensor (13), the second end of the first guide member (11) is raised so that the right outsole (2) guided by the first guide member (11) is supplied to the second guide member (12) and discharged to a second side of the conveyor (3).

Next, as shown in FIG. 4D, the right outsole (2) is stably placed on the second side of the conveyor (3) by the outsole supply (50) positioned below the second guide member (12).

Then, when a left outsole is again discharged to the first guide member (11) from the adhesive applicator, the first guide member (11) descends and is guided to a first side of the conveyor (3; as the above-described process is repeated, a plurality of left outsoles (1) and right outsoles (2) are classified by the dispenser (10) and dispensed to the first and second sides of the conveyor (3).

Hereinabove, an aspect of this invention was described, but this is merely illustrative and the invention is not limited to the above-described aspects; a person of ordinary skill in the relevant art will understand that diverse alterations and other equivalent aspects are possible. Obviously, a person of skill in the art will be able to make many alterations without departing from the concept of this invention. Accordingly, the claimed scope of this invention is not limited within to the detailed description, but will be defined by the following claims and the technical concepts thereof.

DESCRIPTION OF NUMERALS

1. Left outsole
2. Right outsole
3. Conveyor
10. Dispenser
11. First guide member
11a. First guide rod
12. Second guide member
12a. Second guide rod
13. Detection sensor
14. Lifting part
14a. Lifting rod
14b. Lifting cylinder
20. Stationary frame
30. Controller
40. Drive part
41. Drive motor
41a. Shaft
42. Base gear
43. Auxiliary gear
44. Connecting belt
50. Outsole supply
51. Supply member
51a. Supply rod
52. Supply cylinder
100. Shoe outsole dispensing apparatus

What is claimed is:

1. A shoe outsole dispensing apparatus, comprising:
a dispenser located above a conveyor carrying adhesive-coated shoe outsoles, the dispenser adapted to classify the adhesive-coated shoe outsoles into left outsoles and right outsoles and dispense the left outsoles to a first side of the conveyor and the right outsoles to a second side of the conveyor;
a stationary frame that is coupled to the dispenser and fixes the position of the dispenser so that the dispenser remains positioned above the conveyor;
a controller that controls the operation of the dispenser;
a first guide member located near a second guide member that upon receiving an adhesive-coated shoe outsole, guides the adhesive-coated shoe outsole to either a first side of the conveyor or the second guide member;
the first guide member comprising a plurality of rotatable first guide rods that guide the adhesive-coated shoe outsoles placed above the first guide rods, a first end of the first guide member is rotatably connected to the stationary frame so that if a second end of each of the first guide member drops down, the first guide member guides an adhesive-coated shoe outsole to the first side of the conveyor, and if the second end of the first guide member rises, the first guide member guides an adhesive-coated shoe outsole to the second guide member;
the second guide member coupled fixedly to the stationary frame such that upon receiving an adhesive-coated shoe outsole guided by the first guide member, guides the adhesive-coated shoe outsole to the second side of the conveyor, the second guide member having a plurality of rotatable second guide rods;
a detection sensor associated with the first guide member that senses the adhesive-coated shoe outsoles passing the first guide member and transmits the sensing information to the controller;

a lifting part that is adapted to raise and lower the second end of the first guide member;

and wherein the controller is adapted to control the operation of the lifting part based on the sensing information from the detection sensor.

2. The shoe outsole dispensing apparatus according to claim 1, wherein the lifting part comprises:

a lifting rod coupled to the first guide member so that the lifting rod is raised or lowered together with the first guide member;

and a lifting cylinder that is controlled by the controller and is located on the first guide member, which causes the first guide member to be raised or lowered together with the lifting rod.

3. The shoe outsole dispensing apparatus according to claim 2, further comprising a drive part that impels the plurality of rotatable first guide rods to cause the shoe outsoles placed on the first guide member to move;

the drive part comprising:

a drive motor that is coupled to the stationary frame and supplies rotational force;

a base gear on a shaft of the drive motor that rotates upon receiving the rotational force of the drive motor;

auxiliary gears on the plurality of rotatable first guide rods;

and a plurality of connecting belts formed as a belt or chain that are connected to the base gear and auxiliary gears and are mutually connected with the auxiliary gears so as to transmit the rotational force of the drive motor to the first plurality of rotatable first guide rods.

4. The shoe outsole dispensing apparatus according to claim 1, further comprising an outsole supply located on a lower part of the first guide member and second guide member respectively, which causes the outsoles guided by the first guide member to be supplied to the conveyor;

the outsole supply comprising:

a supply member located on a bottom of the second end of the first guide member so as to receive the outsoles guided by the first guide member and guide the adhesive-coated shoe outsoles to the conveyor, within which a plurality of rotatable supply rods are formed so as to guide the adhesive-coated shoe outsoles placed above the supply rods toward the conveyor;

and a supply cylinder that is fixed to a lower part of the stationary frame and moves the supply member back and forth so that the adhesive-coated shoe outsoles placed on the supply member may be set onto the conveyor; and wherein the controller controls the operation of the supply cylinder based on the sensing information from the detection sensor.

* * * * *